United States Patent [19]

Shanoski

[11] 4,374,238

[45] Feb. 15, 1983

[54] ONE COMPONENT IN-MOLD COATING COMPOSITION COMPRISING A COMPOSITION HAVING A PLURALITY OF POLYMERIZABLE ETHYLENIC DOUBLE BONDS AND A MATERIAL CONTAINING ISOCYANATE

[75] Inventor: Henry Shanoski, Akron, Ohio

[73] Assignee: The General Tire & Rubber Company, Akron, Ohio

[21] Appl. No.: 323,213

[22] Filed: Nov. 20, 1981

Related U.S. Application Data

[60] Division of Ser. No. 262,981, May 20, 1981, Pat. No. 4,331,735, which is a continuation-in-part of Ser. No. 163,444, Jun. 26, 1980, abandoned.

[51] Int. Cl.$^3$ .............................................. C08G 18/34
[52] U.S. Cl. ...................................... 528/50; 528/59; 528/75
[58] Field of Search ............................ 528/50, 59, 75

[56] References Cited

U.S. PATENT DOCUMENTS

| | | | |
|---|---|---|---|
| Re. 29,131 | 2/1977 | Smith | 525/920 |
| 3,577,389 | 5/1971 | Kuhar | 528/50 |
| 3,772,404 | 11/1973 | Knight | 525/920 |
| 3,876,726 | 4/1975 | Ford | 525/920 |
| 4,072,770 | 2/1978 | Ting | 525/920 |
| 4,081,578 | 3/1978 | Van Essen | 428/423.7 |
| 4,188,455 | 2/1980 | Howard | 525/920 |
| 4,213,837 | 7/1980 | Bristowe | 525/920 |

FOREIGN PATENT DOCUMENTS

| | | |
|---|---|---|
| 24724 | 7/1967 | Australia . |
| 3666 | 10/1967 | Australia . |
| 443473 | 1/1971 | Australia . |
| 443668 | 12/1971 | Australia . |
| 449891 | 2/1972 | Australia . |
| 464110 | 10/1972 | Australia . |
| 475790 | 6/1974 | Australia . |
| 476660 | 6/1974 | Australia . |
| 466361 | 12/1974 | Australia . |
| 467609 | 12/1974 | Australia . |
| 471603 | 12/1974 | Australia . |

*Primary Examiner*—Maurice J. Welsh

[57] ABSTRACT

An FRP molding can be in-mold coated using a one-component peroxide initiated composition of (a) a liquid crosslinkable composition having an average molecular weight of up to about 5,000, having a plurality of polymerizable ethylenic double bonds, being essentially free of active hydrogen atoms and being essentially free of isocyanate groups and (b) a material selected from the group consisting of (I) a polyisocyanate and (II) the reaction product of an excess of equivalents of a polyisocyanate and an ethylenically unsaturated compound having —NH$_2$, —NH— and/or OH groups, said reaction product being free of active hydrogen atoms.

12 Claims, No Drawings

ONE COMPONENT IN-MOLD COATING COMPOSITION COMPRISING A COMPOSITION HAVING A PLURALITY OF POLYMERIZABLE ETHYLENIC DOUBLE BONDS AND A MATERIAL CONTAINING ISOCYANATE

This application is a division of copending U.S. patent application Ser. No. 06/262,981 filed May 20, 1981, now U.S. Pat. No. 4,331,735 granted May 25, 1982 which was a continuation-in-part of prior copending U.S. patent application Ser. No. 06/163,444 filed June 26, 1980, now abandoned.

This invention relates to a thermosetting in-mold coating composition for in-mold coating a molded fiberglass reinforced thermoset plastic such as a polyester resin or a vinyl ester resin (FRP) molding or part that does not require the combining of two or more components immediately prior to use.

BACKGROUND OF THE INVENTION

A major deficiency of compression molded thermoset glass fiber reinforced polyester (FRP) moldings is surface imperfections such as pits, pores, surface cracks, waviness and sink marks. The in-mold coating process of U.S. Pat. No. 4,081,578 generally overcomes these imperfections by molding a low viscosity thermoset on top of the FRP in a second molding operation. The composition described in U.S. Pat. No. 4,081,578 contains free hydroxyl as well as isocyanate groups that co-react at room temperature, resulting in a limited (about one-half hour) pot life. In practice, the reactive ingredients are kept apart, and combined only immediately prior to application. This necessitates dual pumping equipment and an accurate metering device, which increase the cost and complexity of the system. A single component coating would thus offer a significant advantage.

Therefore, it is an object of this invention to avoid the difficulties alluded to and to provide a process for in-mold coating an FRP molding with a one-component coating composition.

Another object of this invention is to provide a one component composition suitable for in-mold coating an FRP molding.

A further object of this invention is to provide a cured molded FRP molding or part with an adherent coating in-mold coated with a one component in-mold coating composition.

These and other objects and advantages of the present invention will become more apparent to those skilled in the art from the following detailed description and working examples.

SUMMARY OF THE INVENTION

According to the present invention it has been found that a one-component in-mold coating composition, providing an adherent thermoset coating on a FRP substrate on molding and curing, comprises (a) a liquid crosslinkable composition having an average molecular weight of up to about 5000, having a plurality of polymerizable ethylenic double bonds, being essentially free of active hydrogen atoms and being essentially free of isocyanate groups and (b) a material selected from the group consisting of (I) a polyisocyanate and (II) the reaction product of an excess of equivalents of a polyisocyanate and an ethylenically unsaturated compound having —NH$_2$, —NH— and/or —OH groups, said reaction product being free of active hydrogen atoms.

The single component coating of the present invention comprises a thermoset matrix with vinyl reactivity, along with a polyisocyanate or with the reaction product of an excess of equivalents of a polyisocyanate and the ethylenically unsaturated —NH$_2$, —NH— and/or —OH containing compound. The latter serves as a "tie coat" in that it has isocyanate or isocyanate and vinyl functionality that can react with the FRP surface and the matrix respectively.

A difference between the two and one component coating is that the former, as applied, has generally a stoichiometrically balanced amount of isocyanate and polyol, while the latter has an excess of isocyanate and no available polyol or OH etc. Thus, in principle, the two component coat contains substantially no free NCO after the coating operation, while the NCO content of the single component coat is diminished only very slightly by the miniscule amount of active hydrogen at the FRP surface. It is this lack of polyol that permits the single component coat of the present invention to be stored, in principle, indefinitely. It is assumed that after the one component in-mold coating operation, the NCO content of the coating will gradually disappear due to reaction with atmospheric water. In this respect, the coating is similar to urethane varnishes containing free isocyanate that depend on a moisture cure for ultimate properties. The one component in-mold coating and urethane varnishes contain similar levels of free isocyanate: in general about 1.7 to 2% NCO in the one component in-mold coating. Unlike the varnish, however, the properties of the one component in-mold coating are not expected to change substantially with time because of its already very high crosslink density from the vinyl reaction.

Discussion Of Details And Preferred Embodiments

The liquid ethylenically unsaturated crosslinkable composition may be a polyester resin having a plurality of ethylenic double bonds which polymerize or crosslink. Where the ethylenically unsaturated polyester does not readily crosslink, it can be mixed with a crosslinking monomer like styrene and so forth. Other materials can be used which crosslink by themselves like trimethylol propane trimethacrylate and so forth. The ethylenically unsaturated crosslinkable composition used in the in-mold coating composition should have an average molecular weight of up to about 5,000.

A polyester which can be used may be made by copolymerizing maleic anhydride and an alkylene oxide of 3 to 4 carbon atoms such as propylene oxide, butylene oxide, isobutylene oxide and so forth and mixtures thereof. Propylene oxide is preferred. The alkylene oxide may be used in a molar ratio greater than the maleic anhydride to provide a polyester which is essentially or all OH terminated, e.g., a polyester diol. Up to about 50 mol % of the maleic anhydride may be replaced with a saturated anhydride such as phthalic anhydride or other anhydride and mixture thereof. It is preferred to use maleic anhydride. Also, up to 10 mol % of the alkylene oxide moiety may be ethylene oxide. These unsaturated polyesters may be made in benzene, styrene or other solvent using a double metal cyanide catalyst as shown in U.S. Pat. No. 3,538,043. As shown in said patent an isomerization catalyst such as piperidine is used to isomerize the maleate double bonds of the polyester to fumarate double bonds. Morpholine, also, may be used as an isomerization catalyst as shown by U.S. Pat. No. 3,576,909.

Polyesters made by reacting maleic anhydride or maleic acid, fumaric acid, itaconic acid, or citraconic acid with a glycol like propylene glycol, dipropylene glycol, 1,4-butane diol, bisphenol A and so forth including minor amounts of phthalic acid or phthalic anhydride and other diols and dicarboxylic acids may be used. Please see U.S. Pat. Nos. 3,642,672; 3,701,748 and 3,772,241 for similar types of polyesters. The substantially aliphatic polyesters like the fumarate polyesters, and those made using the double metal cyanide catalysts as described above are desirable to use. For more information on making unsaturated polyesters see "Encyclopedia of Polymer Science And Technology," Interscience Publishers, a division of John Wiley & Sons, Inc., New York, Vol. 11, 1969, pages 129 to 168.

Vinyl ester resins, also, may be used. These esters are generally linear, and while they may have one or more ethylenically unsaturated groups along or in the chain, they have an ethylenically unsaturated group at or near each end of the polymer chain. They are prepared by reacting an ethylenically unsaturated acid with a bisphenol A epoxy resin, e.g., the epoxide obtained from bisphenol A and epichlorohydrin. In place of bisphenol A one can use tetrabromobisphenol A. Another vinyl ester resin is the one obtained by reacting a phenolic-novolac with an epoxide like epichlorohydrin to obtain a phenolic novolac epoxide which is then likewise chain terminated with an ethylenically unsaturated acid. Another material to use as a starter for reaction with the acid to make a vinyl ester is a tetraphenylolethane epoxy resin. Other epoxides (backbones) for reaction with the unsaturated acids to make vinyl esters may be used. Bisphenol A/fumarate vinyl esters can be used and which can be made using proper stoichiometry by reacting bisphenol A with maleic acid (fumaric acid or maleic anhydride) to form a hydroxy terminated resin which is then reacted with tolylene diisocyanate (or other diisocyanate like 4,4'-diphenyl methane diisocyanate) to form a NCO terminated material which is chain terminated with a hydroxy alkylacrylate such as hydroxy ethyl acrylate or methacrylate or the NCO terminated material can be end capped with glycols for reaction with a monocarboxylic unsaturated acid to provide vinyl unsaturation. One may further start with polyalkylene ether glycols, polyester glycols, hydroxy terminated polyalkylene ether urethanes and hydroxy terminated polyester urethanes which can be chain terminated by reaction with an ethylenically unsaturated acid. As the ethylenically unsaturated acid for making vinyl esters by termination one may use acrylic acid, methacrylic acid, crotonic acid or cinnamic acid or mixture thereof of which methacrylic acid is preferred. Internal unsaturated groups as discussed above may be provided by maleic acid, fumaric acid, maleic anhydride, itaconic acid or citraconic acid and the like and mixture of the same. For information on vinyl ester resins see "Heat Resistant Vinyl Ester Resins," Launikitis, Technical Bulletin SC:116-76, Shell Chemical Company, June, 1976 and Shell Chemical Company Technical Bulletin SC:16-76. Instead of using an ethylenically unsaturated acid to terminate the above hydroxy terminated backbone polymers one may make use of ester interchange, e.g., reacting the hydroxyl containing backbone polymer with an ester like ethyl, methyl or butyl acrylate, methacrylate or ethacrylate and so forth. Still other vinyl ester resins may be used such as those disclosed in U.S. Pat. No. 3,876,726, where ethylene oxide or propylene oxide is reacted with bisphenol A and the resulting polyoxyalkylene derivative is then reacted with an unsaturated aliphatic dicarboxylic acid or anhydride such as maleic acid, fumaric acid and maleic anhydride and then with hydroxypropyl methacrylate and tolylene diisocyanate to provide a resin with no residual isocyanate groups. Isomerization may be necessary to isomerize maleate groups to fumarate groups if the heat of formation of the vinyl ester is not sufficiently high to cause isomerization.

Mixtures of the ethylenically unsaturated polyesters can be used.

A copolymerizable ethylenically unsaturated monomer is used to crosslink those polyesters or vinyl ester resins which do not readily crosslink, in an amount at least sufficient to copolymerize and crosslink with the polyesters, and includes styrene, alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and so forth and mixture thereof.

The reactive or crosslinkable monomers which can be used by themselves as a liquid crosslinking composition include trimethylol propane trimethacrylate, trimethylol propane triacrylate, pentaerythritol tetracrylate, tetraethylene glycol dimethacrylate, 1,3-butylene glycol diacrylate, polyethylene glycol diacrylate, polypropylene glycol diacrylate, polyethylene glycol dimethacrylate (polyoxyethylene glycol dimethacrylate) preferred, pentaerythritol triacrylate, 1,6-hexanediol diacrylate, polyethylene propylene glycol diacrylate, low molecular weight polybutadienes and so forth and mixtures thereof. Also, these polyfunctional monomers or oligomers may be mixed with the foregoing polyesters. Since some of these reactive polyfunctional monomers are made by reacting unsaturated acids and alcohols and may be mixtures, they may contain some OH and/or COOH groups.

If the liquid crosslinkable composition contains active hydrogen atoms (—OH groups and so forth, active hydrogen atoms, as determined by the Zerewitinoff Method, J.A.C.S., Vol. 49, p. 3181 (1927)), it may be reacted with an organic monoisocyanate to cap or end cap all or essentially all of these groups. Examples of isocyanates which can be used for such purposes are ethyl isocyanate, n-hexyl isocyanate, cyclohexyl isocyanate, n-propyl isocyanate, benzyl isocyanate, phenyl isocyanate (preferred), p-chlorophenyl isocyanate, p-methoxy phenyl isocyanate and the like and mixtures thereof.

The liquid crosslinkable composition should be essentially free of active hydrogen atoms or should be essentially free of isocyanate groups.

While any organic polyisocyanate can be used in the practice of the present invention, it is preferred to employ organic diisocyanates particularly those which are liquid at ambient or room temperature (about 25 degrees C.). Examples of useful diisocyanates or mixtures thereof are 2,4-tolylene diisocyanate (TDI), 2,6-tolylene diisocyanate (TDI), 4,4'-diphenyl methane diisocyanate (MDI), hydrogenated 4,4'-diphenyl methane diisocyanate (or 4,4'-dicyclohexyl methane diisocyanate), polymeric forms of TDI, MDI and hydrogenated MDI, xylene diisocyanate, isophorone diisocyanate, hexamethylene diisocyanate and trimethyl hexamethylene diisocyanate. Of these diisocyanates it is preferred to use 4,4′-diphenyl methane diisocyanate.

The ethylenically unsaturated amino and/or hydroxy containing compound, when used to react with the polyisocyanate, is used in an amount sufficient to convert from about 30 to 50% of the NCO groups of the polyisocyanate to urethane groups so that the resulting reaction product contains polymerizable ethylenically unsaturated or vinyl groups and reactive NCO groups and no active hydrogen atoms. In other words an excess of equivalents of a polyisocyanate is used so that the product does not have any free —NH$_2$, —NH— and/or —OH groups and contains free or unreacted isocyanate groups. Thus, the polyisocyanate now contains an NCO group usually at one end and a vinyl or other unsaturated group usually at the other end. Accordingly, the resulting essentially monomeric urethane compound on curing is tied into or copolymerized into the matrix network. The free NCO group of the isocyanate compound or excess polyisocyanate then reacts in some fashion with the substrate, the thermoset polyester or other substrate surface, through hydrogen bonding, covalent bonding or other means to tie the in-mold coating composition to the substrate surface. Examples of such amino and/or hydroxy containing vinyl or ethylenic compounds are hydroxy propyl methacrylate, hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide and so forth and mixtures of the same. Hydroxy alkyl or alkoxy acrylates and methacrylates are preferred.

A sufficient amount of the poly or diisocyanate or of the amino and/or hydroxy ethylenic compound-polyisocyanate reaction product should be used to tie the isocyanate or the isocyanate and ethylenically unsaturated urethane resulting from their reaction to the crosslinkable composition, the matrix, and to the substrate to get the desired adhesion on curing.

An organic free-radical or free radical generating initiator (catalyst) such as a peroxide is used to catalyze the copolymerization or crosslinking of the ethylenically unsaturated polyester composition and the other ethylenically unsaturated materials when used. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy (2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause crosslinking or curing of the ethylenically unsaturated polyester composition and other ethylenically unsaturated materials. In general the peroxide initiator may be used in an amount of up to about 5% by weight based on the weight of the unsaturated polyester composition and unsaturated monomer(s) employed in the in-mold coating composition.

A polyurethane catalyst preferably should be used to facilitate reaction at a reasonable rate between monoisocyanate and polyisocyanate and the hydroxy containing compounds like the COOH and/or OH containing polyesters, hydroxy propyl methacrylate if used and any water in the other materials including the filler. If slower reactions can be tolerated, a urethane catalyst may not be necessary. The polyurethane catalyst may be a tin compound such as an organotin compound or a tin salt of a carboxylic acid. Examples of such catalysts are tetravalent tin organic compounds like dibutyl tin dilaurate (preferred), dibutyl tin diacetate, tributyl tin acetate, dilauryl tin diacetate, dibutyl tin di-2-ethyl hexoate, di-2-ethyl hexyl tin bis (2-ethyl hexoate), dibutyl tin distearate, tetramethyl tin and tetra-n-butyl tin and the like and mixtures thereof. If the components of the coating composition are freshly made and promptly used for in-mold coating, divalent tin compounds like stannous octoate and stannous oleate and the like or mixtures thereof may be used. However, since these divalent tin compounds may deteriorate on aging or storage, they are less desirable. The polyurethane catalyst is used in am amount of up to about 1.0 part by weight per 100 parts by weight of the isocyanate and polyisocyanate used.

To prevent premature gelation of the ethylenically unsaturated materials and to provide for improved shelf-life or storageability inhibitors are added in the desired amount to the composition or are provided in the raw materials before use. Examples of inhibitors are hydroquinone, benzoquinone, p-t-butyl catechol and the like and mixture thereof.

The in-mold composition additionally can be filled or compounded to give the desired viscosity and flow to the composition for molding and to afford the desired physical properties to the resulting thermoset coating. Examples of such fillers or compounding ingredients are fillers like clay, talc, MgO, Mg(OH)$_2$, CaCO$_3$ and silica, mold release agents, red iron oxide, TiO$_2$, carbon black including conductive carbon black, organic color pigments like phthalocyanine blue or green, antidegradants, U-V absorbers, calcium silicate, paraffin wax, hollow glass or resin micro-spheres, thickening agents (like "Pluracol" PeP 450, propylene oxide adduct of pentaerythritol, average molecular weight of about 450, equivalent hydroxyl weight of 101, BASF Wyandotte), low shrink additives and the like. A preferred filler is talc. A preferred low shrink additive is polyvinyl acetate. These fillers and compounding ingredients should be used in amounts sufficient to provide satisfactory results. However, care should be exercised in the use of high filler contents as this may give high viscosities and result in flow and handling difficulties.

All of the ingredients of the in-mold coating composition should be kept dry or have a minimal amount of moisture or the water content should be controlled to obtain reproducible results, to avoid using unnecessary amounts of isocyanate and to prevent foaming or pore formation.

Mixing of the ingredients of the in-mold composition should be thorough. Injection or compression, transfer molding, or other molding apparatus or machines can be used for the in-mold coating. Molding apparatus and methods may be found in U.S. Pat. Nos. 4,076,780; 4,076,788; 4,081,578; 4,082,486 and 4,189,517. Please see, also, "Proceedings of the Thirty-Second Annual Conference Reinforced Plastics/Composites Institute," SPI, Washington, February, 1977, Griffith et al, Section 2-C, pages 1-3 and "33rd Annual Technical Conference, 1978 Reinforced Plastics/Composites Institute The Society of the Plastics Industry, Inc.", SPI, Ongena, Section 14-B, pages 1-7. The in-mold coating composition can be applied to the substrate and cured at a temperature of about 300 degrees F. and at a pressure of about 1000 p.s.i. for from about 1 to 3 minutes.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth. The glass fiber reinforced thermoset plastic (FRP) such as the polyester resin or vinyl ester resin and glass fiber composition substrate to which the in-mold composition is applied can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975-1976, October, 1975, Vol. 52, No. 10A, McGraw-Hill, Inc., New York, pages 61, 62 and 105 to 107; "Modern Plastic Encyclopedia," 1979-1980, October, 1979, Volume 56, Number 10A, pages 55, 56, 58, 147 and 148 and "Modern Plastics Encyclopedia," 1980-81, October, 1980, Volume 57, Number 10A, pages 59, 60, and 151 to 153, McGraw-Hill, Inc., New York, N.Y. Vinyl ester resins are known as discussed above.

Using the polyester diol a preferred method of making the in-mold coating composition to among other things avoid an undesirable buildup in viscosity is (1) to mix the unsaturated polyester, monoisocyanate, inhibitor, mold release agent and urethane catalyst and any pigment if desired and to allow the monoisocyanate to react at room temperature (about 25 degrees C.) for several hours, usually overnight to cap the active hydrogens of the polyester if such is used, to avoid undesirable viscosity build-up such as would occur if a diisocyanate were used. Then (2) the low-shrink additive, talc and diisocyanate are mixed in and allowed to sit at room temperature for several hours in order that some of the excess diisocyanate will react with the water in the talc since it is not convenient to use very dry talc. Next (3) the hydroxy acrylate or similar material and peroxide initiator are mixed in at room temperature so that the diisocyanate can react with the hydroxy acrylate exclusively without a simultaneous water reaction (from the talc) which might yield a frothy product and without loss of the acrylate —NCO reaction product or active ingredient. With heat the times for the foregoing urethane reactions could be reduced; however, the addition of the peroxide initiator would have to be made as a final addition after the mixture had cooled down to about room temperature.

The one component in-mold composition of the present invention should be protected from moisture to preserve its reactivity and storageability. However, since the compositions contain peroxides, they may gel after eight weeks as normally inhibited. If they are highly inhibited, the gel time decreases to about 50% of the original value after nine weeks' storage at room temperature. Some differences will be observed with different systems. For example, a trimethylol propane trimethacrylate based system may be somewhat better than a polypropylene fumarate based system with respect to gel times on extended storage. It, thus, is preferred to refrigerate the one component in-mold composition if the composition is to be stored for extended periods of time.

The pump stability of the one component in-mold composition appears to be good. A sample of a highly inhibited composition of this invention after several weeks' storage was cycled through a high shear gear pump for more than ten minutes. Pumpability was judged good with no polymer nor filler build-up seen on dismantling the pump.

Occasionally there has been an irritating gas released when the molds were opened on in-mold coating the substrate although such may be minimized if not eliminated by proper venting. However, any NCO in the air over the part is within OSHA limits.

The following examples will serve to illustrate the present invention with more particularity to those skilled in the art. In these examples, the parts are parts by weight unless otherwise indicated.

EXAMPLE I

A SMC composition was compression molded and cured at 300 degrees F. (149 degrees C.) and 600 p.s.i. to make a molded flat plate molding A and a box (having ribs and bosses on the back side) molding B. The SMC composition used contained the following ingredients:

| SMC Composition I | |
|---|---|
| Ingredient | Parts by Weight |
| "Paraplex" P340 | 4000 |
| "Paraplex" P701 | 3013 |
| "Camel-Wite" | 9680 |
| Zinc stearate | 352 |
| TBP | 80 |
| Mg(OH)$_2$ | 336 |
| Glass fibers (OCF951) | 5238 |

A second SMC composition was compression molded and cured at 300 degrees F. (149 degrees C.) and 600 p.s.i. to make a molded flat plate molding C. The SMC composition contained the following ingredients:

| SMC Composition II | |
|---|---|
| Ingredient | Parts by Weight |
| "Derakane" 786 | 4000 |
| "Derakane" VE750 | 2410 |

-continued

| SMC Composition II | |
|---|---|
| Ingredient | Parts by Weight |
| "Derakane" 470-45 | 426.8 |
| TBP | 64 |
| PDO solution | 11.2 |
| Zinc stearate | 316 |
| MgO | 161.6 |
| "Camel-Wite" | 8723 |
| Glass fibers (OCF951) | 4834 |

A one-component in-mold coating composition was prepared according to the above preferred procedure for polyester diols in which the polyester, monoisocyanate, inhibitor, mold release agent and urethane catalyst were mixed together and allowed to react overnight at about room temperature. Then there were added to the polyester mixture the low shrink additive, talc and diisocyanate and the resulting material was allowed to react at about room temperature for several hours. Finally there were added the hydroxy vinyl compound and the peroxide catalyst and mixed in at room temperature. After thorough mixing the resulting in-mold composition was used to in-mold coat (compression molding) the above SMC molded parts A, B and C at a temperature of 300 degrees F. (149 degrees C.) and a pressure of 1000 p.s.i. for from 1 to 3 minutes.

The ingredients of the one-component in-mold coating composition and the results on molding are shown in Table I, below:

TABLE I

| | Run No. | | | | |
|---|---|---|---|---|---|
| | 1 | 2 | 3 | 4 | 5 |
| Ingredient | Parts By Weight | | | | |
| Polyester Phenyl Isocyanate | 76.5 | 76.5 | 76.5 | 76.5 | 76.5 |
| | 6.1 | 6.1 | 6.1 | 6.1 | 6.1 |
| 2% BQ in STY | 2.5 | 2.5 | 2.5 | 2.5 | 2.5 |
| "Zelec" UN | .1 | .1 | .1 | .1 | .1 |
| T-12 | .5 | .5 | .5 | .5 | .5 |
| LP-90 | 57.5 | 57.5 | 57.5 | 57.5 | 57.5 |
| Talc | 57.5 | 57.5 | 57.5 | 57.5 | 57.5 |
| TBP | 1.25 | 1.25 | 1.25 | 1.25 | 1.25 |
| "Isonate" 143L | 0 | 7 | 14 | 21 | 28 |
| Hydroxy propyl methacrylate | 0 | 3.3 | 6.7 | 10 | 13.3 |
| Octanol | 0 | 0 | 0 | 0 | 0 |
| Adhesion Plate A | None | None | Poor | Poor | Fair |
| Adhesion Box B | DNT | DNT | Poor | Good | Good |
| Adhesion Plate C | None | None | Good | Good | Good |

| | Run No. | | | | |
|---|---|---|---|---|---|
| | 6 | 7 | 8 | 9 | 10 |
| Ingredient | Parts By Weight | | | | |
| Polyester Phenyl Isocyanate | 76.5 | 76.5 | 76.5 | 76.5 | 76.5 |
| | 6.1 | 6.1 | 6.1 | 6.1 | 6.1 |
| 2% BQ in STY | 2.5 | 2.5 | 2.5 | 2.5 | 2.5 |
| "Zelec" UN | .1 | .1 | .1 | .1 | .1 |
| T-12 | .5 | .5 | .5 | .5 | .5 |
| LP-90 | 57.5 | 57.5 | 57.5 | 57.5 | 57.5 |
| Talc | 57.5 | 57.5 | 57.5 | 57.5 | 57.5 |
| TBP | 1.25 | 1.25 | 1.25 | 1.25 | 1.25 |
| "Isonate" 143L | 35 | 42 | 49 | 56 | 70 |
| Hydroxy propyl methacrylate | 16.6 | 20 | 23.3 | 26.6 | 33.3 |
| Octanol | 0 | 0 | 0 | 0 | 0 |
| Adhesion Plate A | Good | Good | Good | Good | Good |
| Adhesion Box B | Good | DNT | DNT | DNT | DNT |
| Adhesion Plate C | Good | Good | Good | Good | Good |

TABLE I-continued

| | Run No. | | | |
|---|---|---|---|---|
| | 11 | 12 | 13 | 14 |
| Ingredient | Parts By Weight | | | |
| Polyester Phenyl Isocyanate | 76.5 | 76.5 | 76.5 | 76.5 |
| | 6.1 | 6.1 | 6.1 | 6.1 |
| 2% BQ in STY | 2.5 | 2.5 | 2.5 | 2.5 |
| "Zelec" UN | .1 | .1 | .1 | .1 |
| T-12 | .5 | .5 | .5 | .5 |
| LP-90 | 57.5 | 57.5 | 57.5 | 57.5 |
| Talc | 57.5 | 57.5 | 57.5 | 57.5 |
| TBP | 1.25 | 1.25 | 1.25 | 1.25 |
| "Isonate" 143L | 28 | 0 | 28 | 28 |
| Hydroxy propyl methacrylate | 13.3 | 13.3 | 0 | 0 |
| Octanol | 0 | 0 | 0 | 12 |
| Adhesion Plate A | Good | None | Good[a] | None |
| Adhesion Box B | DNT | DNT | DNT | DNT |
| Adhesion Plate C | DNT | DNT | DNT | DNT |

[a]Coating was soft.

Omission of the talc and low shrink additive from the one component in-mold coating composition did not affect the adhesion. Additional styrene up to about 20% by weight in the one component in-mold composition may be added to the above formulations without deleterious effect; this aids in viscosity control of the one-component in-mold coating. Acceptable one component in-mold coatings can be made with TDI in place of MDI; however, TDI has a high vapor pressure which makes it less desirable. The excess NCO from the MDI-hydroxy acrylate reaction may not only react with the substrate but additionally may form allophanate linkages and biurets with urea groups with the phenyl isocyanate capped polyester.

EXAMPLE II

The method of this example was the same as Example I, above, except that different one component in-mold coating compositions were used. The ingredients of the composition and the results obtained are shown in Table II, below:

TABLE II

| | Run No. | | |
|---|---|---|---|
| | 15 | 16 | 17 |
| Ingredient | Parts By Weight | | |
| "Paraplex" P340 | 75.6 | — | — |
| "Chemlink" 3080 | — | 76.5 | — |
| "Atlac" 382E | — | — | 49.8 |
| Styrene | — | — | 26.8 |
| Phenyl Isocyanate | 6.5 | 2.67 | 5.42 |
| 2% BQ in STY | 2.5 | 2.5 | 2.5 |
| "Zelec" UN | .1 | .1 | .1 |
| T-12 | .5 | .5 | .5 |
| LP-90 | 57.5 | 57.5 | 57.5 |
| Talc | 57.5 | 57.5 | 57.5 |
| "Isonate" 143L | 28 | 28 | 28 |
| Hydroxy propyl methacrylate | 13.3 | 13.3 | 13.3 |
| TBP | 1.25 | .625[c] | .625[c] |
| Adhesion Plate A | Good | Good | Good |
| Adhesion Box B | Good[b] | DNT | Good[b] |

[b]Difficult to release from mold; needed more release agent.
[c]Although peroxide catalyst level was 50% of normal and SPI times (modified SPI gel test run at 230 degrees F. as opposed to 180 degrees F.) were long, the in-mold coatings were successfully compression in-mold coated under the above temperature, pressure and time conditions.

EXAMPLE III

The method of this example was the same as that of Run 13, Example I, above. Plate A was used as the substrate. The ingredients were the same as those of the composition of Run 13 except that the amount of "Isonate" 143L was varied. The results obtained on test are shown in Table III, below:

TABLE III

| "Isonate" 143L, Diisocyanate, Parts by wt. | Adhesion | Pencil Hardness, ASTM D-3363-74 |
|---|---|---|
| 0 | None | F |
| 3.5 | None | F |
| 7.1 | None | H |
| 14.1 | Poor | H |
| 21.2 | Good | F |
| 28.3 | Fair-Good | F |
| 35.4 | Good | F |
| 42.4 | Good | F |
| 49.5 | Fair | F |
| 56.6 | None | F |

As pointed out above at the end of Example I, the polyisocyanate is apparently reacting with the phenyl isocyanate capped polyester to form allophanate groups and biuret groups with possibly urea groups as well as reacting with the substrate during curing.

The in-mold coating compositions of Examples I to III, above, as prepared and before molding and containing both the hydroxy propyl methacrylate and the MDI were all very pasty (pseudoplastic and/or thixotropic). However, the compositions could be pumped and thus were usable although the mixing apparatus for the compositions required follower plates. It is believed that the pastiness of the compositions is due to the reaction product of the hydroxy propyl methacrylate and the MDI which seems to be highly crystalline and partially insoluble in polyesters at room temperature.

EXAMPLE IV

The method of this example was similar to the method of Example I, above, except that the substrate was Adhesion Plate C and the following in-mold coating composition was used:

| Ingredient | Parts By Weight |
|---|---|
| "Chemlink" CL 600 | 29.6 |
| T-12 | .18 |
| 2% BQ in TMPTMA | 1.2 |
| LP 90 | 22.2 |
| Talc | 22.2 |
| Hydroxy propyl methacrylate | 5.89 |
| TBP | 1.375 |
| PDO | .275 |
| "Zelec" UN | .035 |
| XC-72 | 4 |
| "Isonate" 143L | 14.45 |

The in-mold composition was fluid or not pasty after preparation and had excellent shelf-life. The composition did not give off any noticable odor. After in-mold coating, the adhesion of the composition to the substrate was good. Overall this composition is preferred. If the equivalents of the hydroxy propyl methacrylate are increased to equal those of the "Isonate" 143 L, the shelf-life of the composition as an in-mold coating is materially reduced.

EXAMPLE V

Additional in-mold compositions were prepared and tested following the general procedure of Example IV, above, except that the "Chemlink" CL 600 was replaced by the following materials:

SR 210, polyethylene glycol 200 dimethacrylate, $C_{16}H_{26}O_7$, average molecular weight of 336, Startomer Co.

SR 259, polyethylene glycol 200 diacrylate, $C_{14}H_{22}O_7$, molecular weight of 302, Startomer Co.

"Uvithane" 782, a polymerizable urethane based material or oligomer, a low melting solid (Kg/l of 1.2 at 25° C.) having a viscosity at 49° C. of 800–1200 poise and at 82° C. of 85–165 poise, having an unsaturation (equiv./100 grams) of 0.04–0.05 and having an isocyanate content (%) of <0.3. Thiokol/Chemical Division, Thiokol Corporation.

"Uvithane" 783, a polymerizable urethane based material or oligomer. A viscous liquid (Kg/l 1.3 at 25° C.) having a viscosity at 49° C. of 900–1400 poise and at 82° C. of 50–110 poise, having an unsaturation (equiv./100 grams) of 0.2 and having an isocyanate content (%) of <0.3. Thiokol/Chemical Division, Thiokol Corporation.

"Purelast" 169. A urethane-acrylic oligomer having a viscosity cps at 23.4° C. of 250,000, 100% non-volatiles, a density lb./gal. of 8.6, an unsaturation eq./100 g of 0.061 and an isocyanate % of 0.3. Polymer Systems Corporation.

"Purelast" 190. A very viscous urethane-acrylic oligomer having 100% non-volatiles, a density lb./gal. of 9.0, an unsaturation eq./100 g of 0.11 and an isocyanate % of 0.5. Polymer Systems Corporation.

"Chempol" 19–4840. A urethane acrylic resin having 100% polymer solids by weight, an acid number of 0–3, a viscosity, centipoise, of 5000–6000 at 60° C. and a weight per gal. of 9.2–9.4 lbs. It may contain up to 1.0% by weight of free hydroxyethylacrylate. Freeman Chemical Corporation. This resin was not end capped with phenyl isocyanate since the COOH/NCO reaction is very sluggish.

"Chempol" 19–4807. A migh molecular weight polyester resin of 66±1% polymer solids in styrene. It has an acid number of 20–28, a viscosity, centipoises, of 800–1200 at 25° C. and a weight per gallon of 9.2–9.4 lbs. Freeman Chemical Corporation. This resin was not end capped with phenyl isocyanate since the COOH/NCO reaction is very sluggish.

"Uvimer" 530. A 100% solids polyethylenically unsaturated liquid oligomer having a viscosity (Gardner-Holdt) $Z_7$–$Z_8$ (375–600 poises), a weight of 9.8±0.05 lbs./U.S. gal. and a flash point of 98.9° C. (approx.). Polychrome Corporation.

The in-mold compositions made with the above materials were all thixotropic; however, they could still be used to make good adherent in-mold coatings on the substrates. The above in-mold compositions were prepared and tested quickly. Notes for above Examples:

"Paraplex" P340—65% by weight solution of polyester in styrene, the polyester being essentially a polypropylene fumarate. OH No. of about 56.9 and COOH No. of about 29.7 on the polyester. Rohm & Haas Company.

"Paraplex" P701—35% by weight solution in styrene of polymethylmethacrylate containing some carboxyl groups. Rohm & Haas Company.

"Camel-Wite"—Calcium carbonate (limestone), average particle size of 3.3 microns. Campbell Grove Division of H. M. Royal.

TBP-Tertiary butyl perbenzoate.

"Derakane" 786—65% by weight solution of vinyl ester resin in styrene. The Dow Chemical Company.

"Derakane" VE750—35% by weight solution of butadiene-styrene rubber in styrene. The Dow Chemical Company.

"Derakane" 470-45—Solid in styrene. The Dow Chemical Company.

PDO solution—50% by weight of tertiary butyl peroctoate in diallyl phthalate.

OCF 951—Owens-Corning Fiberglass Corporation glass fibers.

Polyester—Polypropylene fumarate polyester, essentially OH terminated, acid no. of less than 1, average molecular weight of from about 2000 to 2400 in styrene monomer (70% PE, 30% STY). The polyester was prepared according to the teachings of U.S. Pat. No. 3,538,043, by reacting propylene oxide and maleic anhydride initiated by fumaric acid using a double metal cyanide catalyst and isomerized with piperidine.

2% BQ in STY—2% by weight of benzoquinone in styrene.

"Zelec" UN—Fatty alcohol phosphate, unneutralized, a release agent. DuPont.

T-12—10% by weight of dibutyl tin dilaurate in styrene.

LP-90—"Bakelite" LP-90—40% by weight of polyvinyl acetate in styrene, viscosity of 1,800 centipoises at 25 degrees C. (Model LVT Brookfield viscometer #4 spindle at 60 rpm), specific gravity 20/20 degrees C. ($H_2O=1$) of 1.008 and solidification temperature of 5 degrees C. Union Carbide Corp.

"Isonate" 143L-Modified but essentially diphenylmethane-4,4'-diisocyanate, a liquid. The Upjohn Co.

DNT—Did not try.

Adhesion—A sharp scalpel was used in an attempt to pick the coating off of the substrate. Any interfacial peeling was considered a failure. This is a very severe test.

"Chemlink" 3080—Trimethylol propane trimethacrylate. OH No. of 15.1 and COOH No. of 0.1. The Ware Chemical Corp.

"Atlac" 382E—Bisphenol A fumarate polyester, 100% solids. OH No. of 51.4 and COOH No. of 10.5. ICI Americas, Inc.

"Chemlink" CL 600—Polyoxyethylene glycol 600 dimethacrylate. Molecular weight of about 770. $C_{36}H_{66}O_{17}$. The Ware Chemical Corp.

2% BQ in TMPTMA—2% by weight of benzoquinone in trimethylol propane trimethacrylate.

XC-72—"Vulcan" XC-72-N472. Conductive furnace carbon black. Cabot Corp.

I claim:

1. A one component composition useful as a thermosetting in-mold coating composition comprising
   (a) a liquid crosslinkable composition having an average molecular weight of up to about 5,000, having a plurality of polymerizable ethylenic double bonds, being essentially free of active hydrogen atoms and being essentially free of isocyanate groups and
   (b) a material selected from the group consisting of (I) a polyisocyanate and (II) the reaction product of an excess of equivalents of a polyisocyanate and an ethylenically unsaturated compound containing —$NH_2$, —NH— and/or —OH groups, said reaction product being free of active hydrogen atoms, said (b) being used in an amount sufficient to secure the adhesion of said coating composition to a molded thermoset polyester resin or vinyl ester resin glass fiber composition.

2. A composition according to claim 1 containing additionally an organic free radical peroxide initiator in an amount sufficient for curing said in-mold coating composition.

3. A composition according to claim 1 where said crosslinkable composition is a phenyl isocyanate capped polypropylene fumarate polyester containing styrene, and where (b) is (II) in which said polyisocyanate is diphenyl methane-4,4'-diisocyanate and said ethylenically unsaturated hydroxyl compound is hydroxypropylmethacrylate.

4. A composition according to claim 3 containing additionally an organic free radical peroxide initiator in an amount sufficient for curing said in-mold coating composition.

5. A composition according to claim 1 where said crosslinkable composition is a phenyl isocyanate capped bisphenol a fumarate polyester containing styrene, and where (b) is (II) in which said polyisocyanate is diphenyl methane-4,4'-diisocyanate and said ethylenically unsaturated hydroxyl compound is hydroxypropylmethacrylate.

6. A composition according to claim 5 containing additionally an organic free radical peroxide initiator in an amount sufficient for curing said in-mold coating composition.

7. A composition according to claim 1 where said crosslinkable composition is a phenyl isocyanate capped trimethylol propane trimethacrylate which contained some hydroxyl groups, and where (b) is (II) in which said polyisocyanate is diphenylmethane-4,4'-diisocyanate and said ethylenically unsaturated hydroxyl compound is hydroxy propyl methacrylate.

8. A composition according to claim 7 containing additionally an organic free radical peroxide initiator in an amount sufficient for curing said in-mold coating composition.

9. A composition according to claim 1 where said crosslinkable composition is a phenyl isocyanate capped polypropylene fumarate polyester containing styrene, and where (b) is (I) in which said polyisocyanate is diphenyl methane-4,4'-diisocyanate.

10. A composition according to claim 9 containing additionally an organic free radical peroxide initiator in an amount sufficient to effect curing of said in-mold coating composition.

11. A composition according to claim 1 where said crosslinkable composition is polyoxyethylene glycol dimethacrylate having a molecular weight of about 770 and where (b) is (II) in which said polyisocyanate is diphenyl methane-4,4'-diisocyanate and said ethylenically unsaturated hydroxyl compound is hydroxypropylmethacrylate.

12. A composition according to claim 11 containing additionally an organic free radical peroxide initiator in an amount sufficient to effect curing of said in-mold coating composition.

* * * * *